US008953616B2

(12) United States Patent
Allan et al.

(10) Patent No.: US 8,953,616 B2
(45) Date of Patent: Feb. 10, 2015

(54) SHORTEST PATH BRIDGING IN A MULTI-AREA NETWORK

(75) Inventors: David Ian Allan, San Jose, CA (US); János Farkas, Kecskemét (HU); Panagiotis Saltsidis, Stockholm (SE); Martin Julien, Laval (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 374 days.

(21) Appl. No.: 13/442,139

(22) Filed: Apr. 9, 2012

(65) Prior Publication Data

US 2013/0195111 A1    Aug. 1, 2013

Related U.S. Application Data

(60) Provisional application No. 61/592,388, filed on Jan. 30, 2012.

(51) Int. Cl.
*H04L 12/28* (2006.01)
*H04L 12/56* (2006.01)

(52) U.S. Cl.
USPC ...................... 370/395.53; 370/400

(58) Field of Classification Search
None
See application file for complete search history.

(56) References Cited

U.S. PATENT DOCUMENTS

| 8,005,081 B2 | 8/2011 | Bragg et al. | |
| 2004/0042454 A1* | 3/2004 | Zabihi et al. | 370/392 |
| 2005/0286541 A1* | 12/2005 | Bottorff et al. | 370/401 |
| 2008/0144644 A1 | 6/2008 | Allan et al. | |
| 2010/0020797 A1* | 1/2010 | Casey et al. | 370/390 |
| 2012/0243539 A1* | 9/2012 | Keesara | 370/392 |
| 2013/0077625 A1* | 3/2013 | Khera et al. | 370/390 |

OTHER PUBLICATIONS

Interworking Task Group of IEEE, "Media Access Control (MAC) Bridges and Virtual Bridged Local Area Networks—Amendment XX: Shortest Path Bridging", IEEE P802.1aq/D4.6.0, Draft Amendment to IEEE std 802.1Q-2011, Feb. 10, 2012, 363 Pages.
Callon, R., "Use of OSI IS-IS for Routing in TCP/IP and Dual Environments", http://tools.ietf.org/rfc/rfc1195.txt, Digital Equipment Corp., Dec. 1990, 80 pages.
Fedyk, D., et al. "IS-IS Extensions Supporting IEEE 802.1aq Shortes Path Bridging", http://www.rfc-editor.org/in-notes/authors/rfc6329.txt, Apr. 2012, 35 pages.
Sajassi, Ali, et al., "PBB E-VPN draft-sajassi-l2vpn-pbb-evpn-03.txt", http://tools.ietf.org/html/draft-sajassi-l2vpn-pbb-evpn-03, Oct. 8, 2011, 21 pages.

* cited by examiner

*Primary Examiner* — Chirag Shah
*Assistant Examiner* — Srinivasa Reddivalam
(74) *Attorney, Agent, or Firm* — Blakely, Sokoloff, Taylor & Zafman, LLP

(57) ABSTRACT

A method that improves multi-area routed Ethernet network design, in which multipath implementation in each of the areas is independent of each other area to allow optimal network design in each area. The network implements a shortest path bridging medium access control (SPBM) protocol. The areas include a Level 2 (L2) routing area coupled to a Level 1 (L1) routing area via multiple area border bridges (ABBs). The L1 routing area including a backbone edge bridge (BEB) coupled to the ABBs via multiple L1 multipath instances identified by respective backbone VLAN identifiers (B-VIDs). The ABBs receive an advertisement from the BEB that indicates a set of BEB identifiers, each of which identifies the BEB and is associated with a respective B-VID. Each of the BEB identifiers is unique. The ABBs also advertise into the L2 routing area, and translate the B-VIDs based on service identifiers for frames transiting the ABBs.

18 Claims, 12 Drawing Sheets

Abstracted view seen by L1-A

SHORTEST PATH BRIDGING IN A MULTI-AREA NETWORK

CROSS REFERENCE TO RELATED APPLICATIONS

The present application claims priority from U.S. Provisional Patent Application No. 61/592,388, filed on Jan. 30, 2012.

FIELD

Embodiments of the invention relate to the field of Ethernet networks; and more specifically, to improved shortest path bridging in a multi-area network.

BACKGROUND

Ethernet was initially developed for providing network connectivity in a passive shared medium, such as a local area network (LAN). Over time, Ethernet has evolved into an actively switched network that provides bridging and discovers the location of endpoints across the bridged network segments. Where multiple bridges are used to interconnect network segments, multiple potential paths to the same destination often exist. The benefit of this multipath architecture is that it provides path redundancy between bridges and permits capacity to be added to the network in the form of additional links. To prevent loops from being formed, a spanning tree was generally used as the forwarding path for data frames thus restricting the manner in which traffic was broadcast on the network. The basic forwarding principle is to forward everywhere if the destination is unknown and the reachability of destinations is learnt from the source address of data frames; therefore, learning is based on a response to a broadcasted frame. Since both the request and response follow the spanning tree, all of the traffic would follow the links that were part of the spanning tree. This often led to over-utilization of the links that were on the spanning tree and waste for the links that were not part of the spanning tree.

Shortest Path Bridging (SPB) introduces link state routing to Ethernet as a replacement for spanning tree protocols. SPB uses sets of shortest path trees in lieu of a single or a small number of spanning trees. The term SPB covers two modes of operation, SPB-VID (SPBV) mode and SPB-MAC (SPBM) mode, where MAC stands for media access control. The IEEE 802.1aq standard published in 2012 defines a routing solution for Ethernet applicable to PB (IEEE 802.1ad Provider Bridges published in 2005, also known as Q-in-Q) or PBB (IEEE 802.1ah Provider Backbone Bridges published in 2008, also known as MAC-in-MAC). Currently the IEEE 802.1aq standard defines a single routing area for a PB or PBB network.

SPB uses the Intermediate System to Intermediate System (IS-IS) routing protocol. IS-IS is described, for example, in ISO 10589 and IETF RFC 1195, and the extensions for SPB are documented in RFC 6329. IS-IS can be used to synchronize a common repository of information across multiple platforms. It is practical to condense all SPB control and configuration into a single control protocol: the ISIS-SPB protocol. This consolidation is possible because the provider B-MAC, Virtual LAN Identifier (VID) for SPBV, Backbone VID (B-VID) for SPBM and Service Identifier information in the form of I-SID are all global to the network. Connectivity can be constructed using the IS-IS distributed routing system where each node independently computes the forwarding paths and populates the local filtering database (FDB) based on the information in the routing system database.

As the network increases in size, and larger numbers of nodes are included in the network, it may be desirable to divide the network into two or more smaller areas. This allows the control plane to be separated into two or more instances, so that the routing updates may be contained within the smaller routing area and changes within one area do not perturb the adjacent areas. Further, the computational complexity (which tends to be exponential in proportion to network size) benefits from partitioning the network into smaller areas. However, current multi-area networks do not currently embody the concept of multi-pathing as employed by 802.1aq, which is edge based assignment of traffic onto a plurality of Equal Cost Tree sets. As a result, network designs in different areas of the network cannot be easily decoupled from one another.

SUMMARY

A routed Ethernet network may include multiple routing areas, where it is desirable that the multipath implementation in each of the areas is independent of each other area to allow optimal network design in each of the areas and to maximize the operational decoupling of the areas. The network implements a shortest path bridging medium access control (SPBM) mode for sending frames across the areas. The areas include a Level 2 (L2) routing area coupled to one or more Level 1 (L1) routing areas via a plurality of area border bridges (ABBs). The L1 routing area including a backbone edge bridge (BEB) coupled to the ABBs via a plurality of L1 multipath instances that are identified by respective backbone VLAN identifiers (B-VIDs). Each L1 multipath instance provides the shortest path from the BEB to a virtualized node representing the L2 routing area by transiting a respective one of the ABBs. It is possible to envision other embodiments for how L2 is modeled in L1 and the transit ABB for a given BEB-BEB path is selected, modeling L2 and the other subtending L1 areas as a single virtual node being a preferred embodiment.

In one embodiment, a method comprising the step of the ABBs receiving an advertisement from the BEB that indicates a set of BEB identifiers, each of which identifies the BEB and is associated with a respective one of the B-VIDs, wherein each BEB identifier is unique. The advertisement further indicates that a given one of the BEB identifiers is associated with a given L1 B-VID and one or more service identifiers (I-SIDs), the given L1 B-VID identifying a given one of the L1 multipath instances that transits into the L2 routing area via a transit ABB. The method further comprises the step of the transit ABB advertising into the L2 routing area, indicating that the given BEB identifier is associated with the service identifier and an L2 B-VID identifying an L2 multipath instance. This advertisement allows frames destined for the BEB via the given L1 multipath instance to be forwarded to the transit ABB. The ABB uses computation of the preferred shortest path between the BEB and the virtual node representing L2 as the means of self-selecting the role of transit node for the B-MAC/B-VID combination advertised by the BEB. Subsequently, the given BEB identifier is advertised only by the transit ABB among the plurality of ABBs.

The method further comprises the steps of the transit ABB translating, based on the I-SID service identifier, the given L1 B-VID into the L2 B-VID for frames that transit from the L1 routing area to the L2 routing area and translating, based on the service identifier, the L2 B-VID into the given L1 B-VID for frames that transit from the L2 routing area to the L1 routing area.

In one embodiment, a network element comprises a receiver interface configured to receive a first advertisement from the BEB that indicates a set of BEB identifiers, each of which identifies the BEB and is associated with a respective one of the B-VIDs, wherein each BEB identifier is unique. The first advertisement further indicates that a given one of the BEB identifiers is associated with a given L1 B-VID and a service identifier, the given L1 B-VID identifying a given one of the L1 multipath instances that transits into the L2 routing area via a transit ABB. The ABB also includes a transmitter interface to transmit a second advertisement into the L2 routing area indicating that the given BEB identifier is associated with the service identifier and an L2 B-VID identifying an L2 multipath instance. This advertisement allows frames destined for the BEB via the given L1 multipath instance to be forwarded to the transit ABB. The given BEB identifier is advertised only by the transit ABB among the plurality of ABBs.

The network element further includes a memory coupled to the receiver interface and the transmitter interface to store a translation table indexed by service identifiers. The network element further includes a processor coupled to the memory configured to translate, based on the service identifier, the given L1 B-VID into the L2 B-VID for frames that transit from the L1 routing area to the L2 routing area; and translate, based on the service identifier, the L2 B-VID into the given L1 B-VID for frames that transit from the L2 routing area to the L1 routing area.

The tables for the mapping of service identifier to B-VID in each area may be manually provisioned, or algorithmically derived, with the proviso that service to VID mappings must be common and synchronized across each routing area.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DESCRIPTION OF EMBODIMENTS

Figure 1:
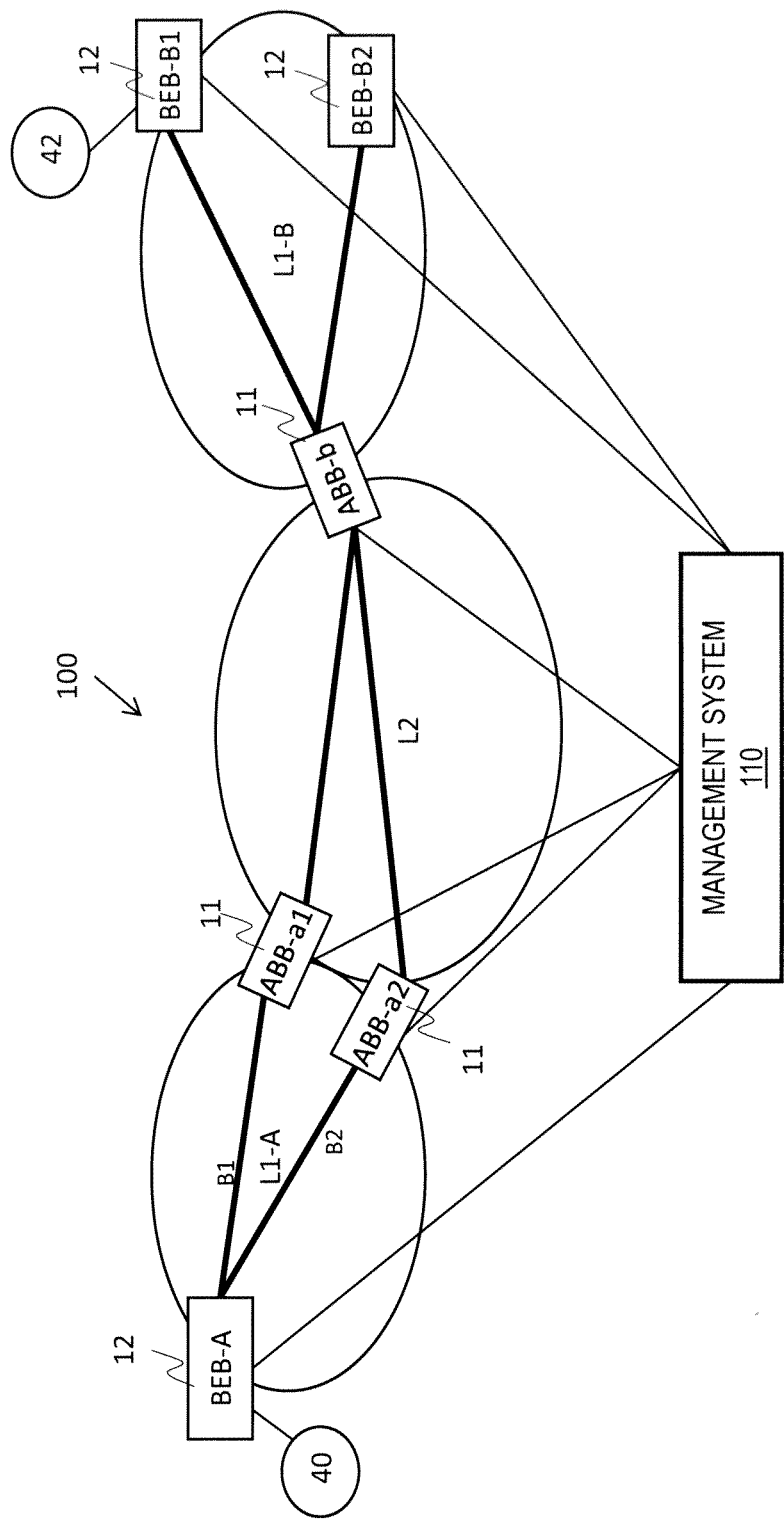
FIG. 1 illustrates a multi-area routed Ethernet network in which embodiments of the invention may operate.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The multi-area network structure described herein is hierarchical, which simplifies the task of providing loop free symmetrical connectivity between the nodes in different areas. A loop in the forwarding path for Ethernet can be catastrophic if the forwarding path is a multicast path. Therefore, it is advantageous to use a routing hierarchy versus mesh interconnect of peer networks as the problem of ensuring loop freeness even in the presence of routing policy is simplified. In one embodiment, the network structure includes a two level hierarchy: Level 1 (L1) routing areas and Level 2 (L2) routing areas, where L1 can be considered to be the network edge, and L2 the backbone. Frames originated from one L1 routing area can reach other L1 routing areas through the L2 routing area only. The L2 network may be further formed as a second layer L1/L2/L1 network so that the multi-area network structure may recurse such that the L2 network layer of a lower layer (Layer X) is formed as a L1/L2/L1 set of network layers referred to as a higher layer (Layer X+1) network. Recursion of this nature may occur multiple times to enable a hierarchical network structure to be developed.

In one scenario, the L1 network may represent the connections within a data center or enterprise site, and the L2 network may represent the connections among different data centers/sites accordingly. According to embodiments of the invention, different L1 networks may adopt different multipathing configurations, and these multipathing configurations may be different from the multipathing configuration of the L2 network. Thus, the embodiments of the invention allow network design (e.g., the multipathing configurations) in each of the routing areas to be decoupled from each other. As a result, the network design in each area can be finely tuned to the requirements and constraints of that area and can be optimized independently of the other areas of the network.

The following description will focus on SPBM (IEEE 802.1aq using IEEE 802.1ah encapsulation), as SPBM can potentially scale better (e.g., an order of magnitude or more) than SPBV in a multi-area network. In SPBM, the Backbone MAC (B-MAC) addresses of the participating nodes is distributed by ISIS-SPB. Topology data is the input to a calculation engine which computes symmetric shortest path trees based on the minimum cost from each participating node to all other participating nodes. When customer traffic enters a provider network implementing SPBM, the Customer MAC address (C-MAC) is resolved to a provider (Backbone) MAC address (B-MAC), so that the provider may forward traffic on the provider network using the provider MAC address space. Additionally, the network elements on the provider network are configured to forward traffic based on a Backbone Virtual LAN ID (B-VID) so that different frames addressed to the same destination address but having different B-VIDs may be forwarded over different paths (referred to as "multipath instances") through the network. A frame in accordance with SPBM includes a header that has separate service identifier (I-SID) and B-VID. This separation permits the services to scale independently of network topology. Thus, the B-VID can be used exclusively as an identifier of a multipath instance. The I-SID identifies a specific service to be provided by the multipath instance identified by the B-VID. The I-SID is unique and consistent within an SPBM network.

Although specific versions of standards are described herein, embodiments of the invention are not limited to an implementation based on the current versions of the standards as they may be configured to work with future versions of the standards when they are developed. Similarly, embodiments of the invention are not limited to an implementation that operates in connection with one of the particular protocols described herein as other protocols may be used in an Ethernet multi-area routing network as well.

In conventional multi-area networks, there is no concept of equal cost tree (ECT) sets. Multipath in routed networks is typically hop by hop and there is no requirement for symmetric congruence of unicast-multicast and forward-backward traffic. The applicability of SPBM to the datacenter is leading to network designs with 16-way or more multi-pathing, finely tuned to the network design. Within the current defined state of the art, no current solution exists to permit multiple SPBM "domains" with different multi-pathing configurations to be interconnected.

One basic concept described herein is to enable per customer service instance assignment to a multipath instance in each domain (equivalently, area). Potential issues with arbitrary remapping of services to backbone VLANs at area boundaries is identified and solutions proposed. Finally, operational procedures for migrating customer service instances between multipath instances in each area in isolation is described.

One advantage of the techniques described herein is that each area is operationally isolated and can be designed independently of any peer domain. This ability to re-map multipathing between domains facilitates interworking with other control protocols and Wide Area Network (WAN) technologies, such as interworking between SPBM, IEEE 802.1Qbp and IETF standard TRILL (Transparent Interconnect of Lots of Links).

FIG. 1 illustrates one example of a routed Ethernet network 100 in which multiple link state protocol controlled areas are interconnected via Area Border Bridges (ABB) 11. Specifically, the network 100 includes a first set of link state protocol controlled routing areas L1-A and L1-B (also referred to as the L1 routing areas). The first set of link state protocol controlled areas may be, for example, metropolitan area networks or networks within data centers, although the invention is not limited to these particular examples. The areas L1-A and L1-B are interconnected by another link state protocol controlled routing area L2. The L2 routing area may be, for example, a provider core network configured to interconnect the L1 routing areas.

Customers connect to the networks via Backbone Edge Bridges (BEBs) 12. Within each routing area, connectivity can be established via Backbone Core Bridges (BCBs) (not shown). Each of the bridges (e.g., the ABBs 11, the BEBs 12 and the BCBs) can be configured by a network management system 110. In one embodiment, the network management system can be one or more server computers coupled to the ABBs 11 and the BEBs 12 via the network 100.

Assume, as shown in FIG. 1, that a customer device 40 connecting to L1-A via BEB-A would like to be able to communicate with a customer device 42 that connects to L1-B via BEB-B1. To enable this communication, it will be necessary to establish a route between customer devices 40 and 42 via routing areas L1-A, L2 and L1-B.

It will be assumed, for purposes of this example, that routing areas L1 and L2 are both link state protocol controlled routing areas, each of which is implementing its own link state routing protocol instance. Thus, routing information is generally contained within the various routing areas, and only a limited or summarized amount of routing information is exchanged between the areas. As described in greater detail herein, the ABBs 11 may allow service identifiers such as I-SIDs and some associated BEB information to be leaked between the routing areas, so routes associated with the BEBs with I-SIDs in common may be established through more than one area. Specifically, because interest in the I-SID may be leaked across the network boundary, route segments may be established for the I-SID in each of the routing areas that collectively form a multi-area route. Because leaking of the I-SIDs may be done without intervention by the management system 110, the inter-area routes may be established automatically by the control planes of the multiple routing areas. In one embodiment, the control planes are distributed and information is exchanged using the IS-IS protocol.

To allow bi-directional communication, the ABBs 11 on the boundary between two routing areas advertise summarized network end system information (typically addresses of BEBs and BCBs and the associated service instances) such that an L1 routing system has simplified knowledge of L2 and the other L1 routing areas, and L2 has simplified knowledge of the subtending L1 routing areas. Thus, for example in FIG. 1, ABB-a1 and ABB-a2 each sit on the boundary between routing area L1-A and L2. Accordingly, each of ABB-a1 and ABB-a2 can advertise the ability to reach destinations in routing areas L1-B and L2 within routing area L1-A, and advertise the ability to reach destinations in routing area L1-A within routing area L2. Similarly, ABB-b can advertise the ability to reach destinations in routing areas L1-A and L2 within routing area L1-B, and advertise the ability to reach destinations in routing area L1-B within routing area L2.

Figure 2:
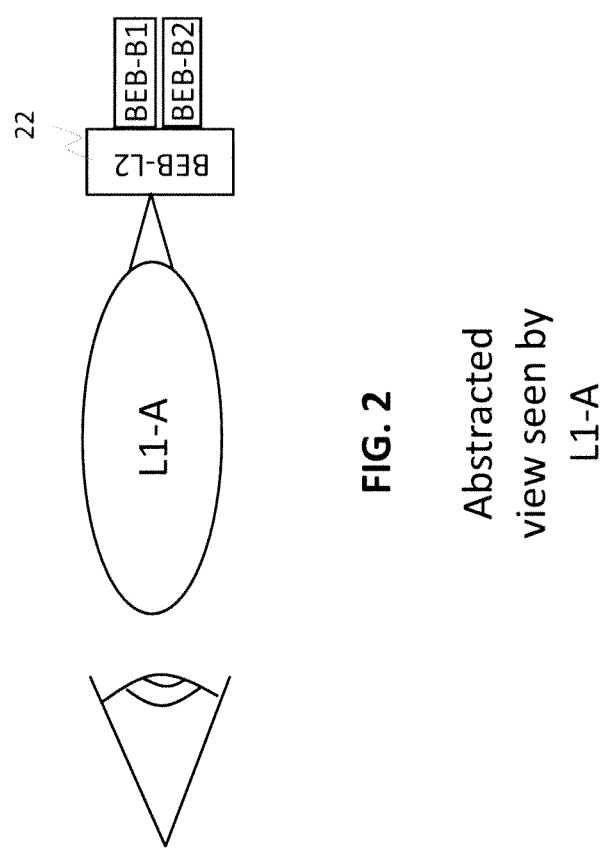
FIG. 2 illustrates an abstracted view seen by an L1 routing area according to embodiments of the invention.

In one embodiment, the ABBs 11 may represent and advertise routing area L2 into the subtending L1 as a single virtual node attached to each L1 routing area and reachable via the ABBs. More specifically, L2 is advertised to each L1 as a single virtual BEB that hosts all the other nodes (e.g., BEBs 12) in the other subtending L1 areas. Thus, a single node can advertise a set of B-MAC addresses (which represent the BEBs 12) as being terminated locally to thereby facilitate internal de-multiplexing of traffic. A single nodal nickname associated with the virtual node is used for all multicast traffic from L2. As shown in the example of FIG. 2, the abstracted view seen by L1-A toward L2 would be a virtual BEB (represented by BEB-L2 22) hosting BEB-B1 and BEB-B2.

The shortest path from a BEB to the virtual node (representing L2) determines the ABB of transit to L2. This ABB is also referred to as the "transit ABB" for the path. In the example of FIG. 1, ABB-a1 and ABB-a2 are closest to BEB-A via two different multipath instances (represented by B-VID1 (B1) and B-VID2 (B2)). B1 and B2 represent two different multipath instances (also referred to as "paths") of equal cost, and each multipath instance is a shortest path between BEB-A and the virtual BEB representing L2. In one scenario, a first route (B1) from BEB-A can enter L2 via ABB-a1, and a second route (B2) from BEB-A can enter L2 via ABB-a2. It is possible that a BEB is located in L1 such that there is only one shortest path to the virtual node represented by L2, in which case for that BEB, multipath instances B1 and B2 would transit a single ABB (e.g. ABB-a1).

Embodiments of the invention allow the use of different numbers of B-VIDs (hence, ECT sets) in different routing areas. For example, an L1 routing area and an L2 routing area can have different numbers of B-VIDs. Thus, there is no one-to-one correspondence between the B-VIDs in L1 (e.g., L1-A or L1-B) and L2. However, the same BEB (e.g., BEB-A) cannot exist as a single B-MAC address in L2 on different ABBs (e.g., ABB-a1 and ABB-a2) at the same time, as such existence would be a violation of the Ethernet routing protocol and physical implementation as it would imply a MAC address existed at two points at once. According to one embodiment of the invention, a BEB in an L1 is provided with a unique BEB identifier for each multipath instance in that L1 that connects to the BEB. That is, a BEB that connects to multiple multipath instances (each identified by a different B-VID) are given multiple unique BEB identifiers, one unique BEB identifier per B-VID (or per B-VID and per PIP (provider instance port). In one embodiment, the BEB identifier is a B-MAC address. The implementation of multiple BEB identifiers for the same BEB may be hidden in proprietary fabric; therefore no IS-IS changes are necessary.

According to an alternative embodiment, lower bits of the BEB's B-MAC address may be used to encode multipath instances into L2. These bits are by definition zero in L1, for all unicast MAC addresses. A blind Network Address Translation (NAT) function can be implemented, which zeros the lowest n bits for all unicast frames going from L2 into L1. Additionally, a comparable NAT function can be implemented, which performs the following: for all unicast frames going from L1 into L2, insert VLAN ID (VID) information into the lowest n bits to provide the frames with a unique ID in L2. However, this multipath encoding appears to increase the complexity of network implementation.

There are specific rules for how ABBs leak information between areas. An ABB closest to a BEB in L1 will advertise (via link state advertisements or using other messages) the I-SIDs and BEB MAC addresses associated with that L1 area into L2, if the I-SID has been configured to be associated with a B-VID in L2 (implying that there are other L1s interested in the I-SID).

Figure 3:
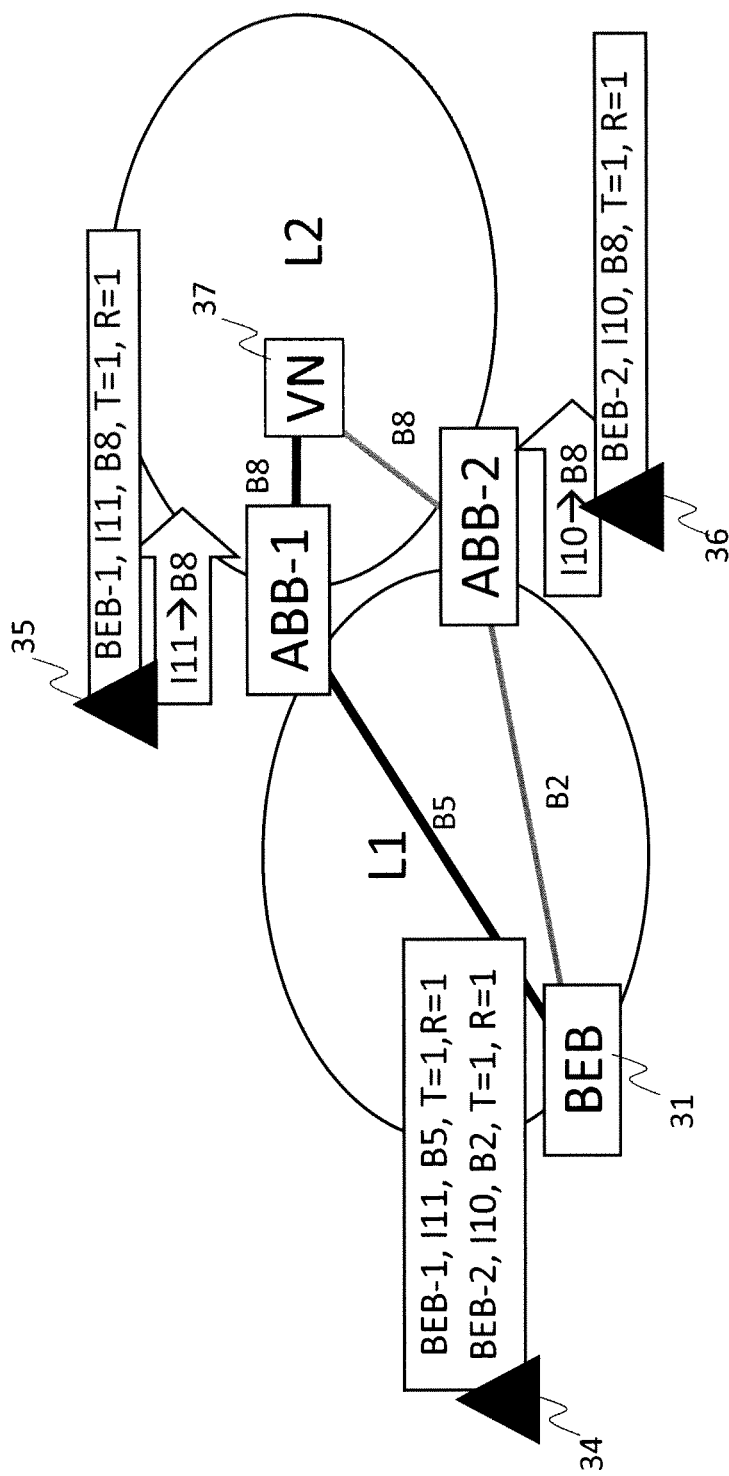
FIG. 3 illustrates an embodiment of a multi-area routed Ethernet network in which a unique identifier is assigned to a BEB per local multipath instance.

FIG. 3 is a diagram that further illustrates an embodiment of the invention in which a BEB 31 is associated with multiple I-SIDs (I10 and I11) and multiple B-VIDs (B2 and B5) in L1. In the example of FIG. 3, each dark triangle (34, 35 or 36) represents an IS-IS speaker associated with one of the nodes (e.g., BEB 31, ABB-1 or ABB-2). Each IS-IS speaker 34-36 advertises network information on behalf of its associated node. The rectangular block next to the triangle indicates the content of the advertisement, which includes one or more sets of (BEB identifier, I-SID, B-VID, and multicast interest for the I-SID, represented by the transmit indicator (T) and receive indicator (R)), where the BEB identifier identifies a BEB that is interested in the advertised I-SID. The transmit indicator (T) and the receive indicator (R) indicate, respectively, whether the associated node is to transmit and to receive multicast frames for the I-SID. For example, (T=1, R=1) indicates that a node is to transmit and receive, (T=1, R=0) indicates that a node is to transmit but not receive, and (T=0, R=1) indicates that a node is to receive but not transmit. These variations are used to produce different connectivity constructs such as a LAN service or rooted multipoint.

To prevent the same B-MAC address (e.g., the B-MAC representing BEB 31) appearing in the advertisements of multiple ABBs that are on the same L2 multipath instance (identified by the same B-VID (B8) in L2 in this example), BEB 31 is given multiple unique BEB identifiers (e.g., BEB-1 and BEB-2), one for each B-VID in L1 (that is, one for each multipath instance in L1).

As described above, L2 is represented by a virtual node (VN 37) when paths were computed. According to one embodiment of the invention, ABBs auto-elect which ABB represents L1 BEB into L2, on the basis of the shortest path between the BEB and the virtual node representing L2 which is dual (or more)-homed onto the ABBs and how tie breaking is performed between multipath instances. The mechanisms defined for 802.1aq will ensure all nodes agree on the routing of each individual path in a multipath instance. The elected ABB advertises the I-SIDs and B-MACs associated with BEB 31 that it represents into L2. In the example of FIG. 3, the I-SIDs and B-MACs associated with BEB 31 are advertised into L2 by ABB-1 and ABB-2, as both of which are on the shortest path between BEB 31 and VN 37; ABB-1 is determined to be on the shortest path for the multipath instance identified by B-VID 5, and ABB-2 is on the shortest path for B-VID 2.

In L2 the multipath instances identified by BVID 2 and BVID 5 are collapsed to a single multipath instance represented by BVID 8. The association of BEB 31 with distinct identifiers per B_VID in L1 means that the forwarding tables in L2 can be properly constructed in B-VID 8. A common B-MAC address for BEB 31 in both BVID 2 and BVID 5 would have made this impossible. The common address would have been associated with multiple destinations in L2 (ABB-1 and ABB-2).

Although not shown in FIG. 3, ABBs also advertise from L2 into L1 when configured to do so. However as L2 is represented by a common node (the VN) into L1, the issue of a B-MAC appearing as rooted on multiple ABBs does not arise.

In one embodiment, I-SID to B-VID bindings are imposed locally in each L1 routing area. Therefore, an ABB can infer from the BEB advertisement what B-VID an I-SID was assigned to. Where the set of B-VIDs used in L2 does not overlap the set of B-VIDs in any peer L1, I-SID to B-VID bindings are also imposed locally in each L2 routing area. The I-SID to B-VID bindings in L1 and L2 routing areas can be achieved by explicit management action.

Embodiments of the invention provide the ability to re-map I-SIDs and B-VIDs to a different number of B-VIDs at each area boundary without restriction. In the example of FIG. 3, ABB-1 and ABB-2 remaps two B-VIDs (B2 and B5) in L1 to one B-VID (B8) in L2. In one embodiment, ABBs implement a unidirectional B-VID re-writing function indexed by I-SIDs for the L1-to-L2 path and the L2-to-L1 path. For example, each ABB-1 and ABB-2 may include a first portion of a translation table specific for the frames going from L1 to L2, and a second portion of the translation table specific for the frames going from L2 to L1. In one embodiment, the translation table is indexed by I-SIDs. In some embodiments, the translation table is indexed by I-SIDs and the T attribute (transmit indicator), and contains the B-VID value used to overwrite the existing value.

In the example of FIG. 3, the translation table of ABB-1 may indicate that frames arriving at ABB-1 with I-SID being I11 is to be sent into L2 on the multipath instance B8 (indicated in FIG. 3 as an arrow below the IS-IS speaker 35). Similarly, the translation table of ABB-2 may indicate that frames arriving at ABB-2 with I-SID being I10 is to be sent into L2 on the multipath instance B8 (indicated in FIG. 3 as an arrow below the IS-IS speaker 36). The translation tables of ABB-1 and ABB-2 may implement analogous B-VID rewriting function for frames going from L2 to L1. In one embodiment, the translation tables in the ABBs may be populated by management action. Although not illustrated in FIG. 3, the translation table at each ABB would be complete and identical, in the sense that all I-SIDs and the associated B-VIDs would be present in the table at each ABB and the tables at each ABB would have the same content. In the scenario where an ABB had more than one subtending L1 area, there would be a unique set of translation tables for each pairwise area relationship; e.g., one for the first L1 to L2 and vice versa, and one for the second L1 to L2 and vice versa.

Figure 4:
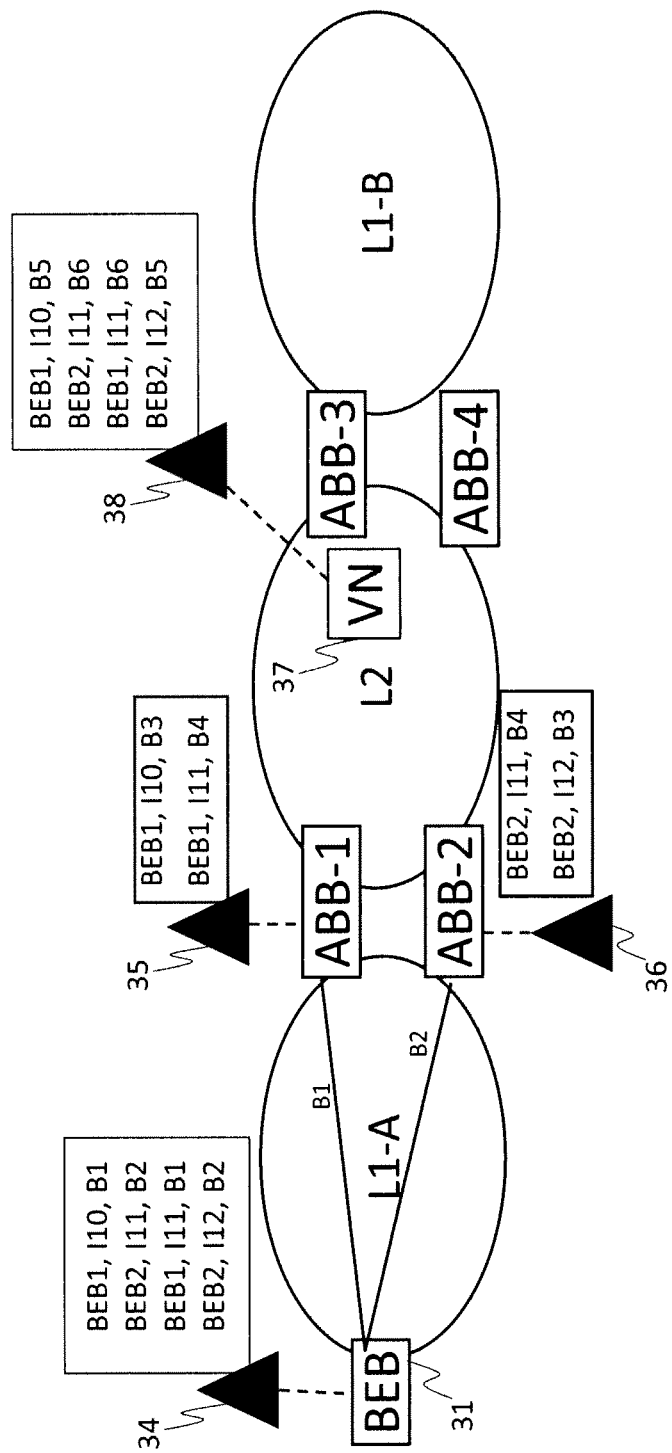
FIG. 4 illustrates the use of unique identifiers for a BEB in one scenario according to an embodiment of the invention.

FIG. 4 is a diagram illustrating an example of a scenario in which the number of multipath instances changes over time (e.g., goes up and down), such that an I-SID in one multipath instance of one area ends up in a different multipath instance in another area. The example is used to show that this scenario does not create any problem according to one embodiment of the invention, where a BEB (e.g., BEB 31) is given a unique BEB identifier in each local B-VID (of L1-A).

In the example of FIG. 4, the IS-IS speaker 34 of BEB 31 advertises, at least in part, "BEB 1, I10, B1", "BEB2, I11, B2", "BEB 1, I11, B1" and "BEB2, I12, B2" into the L1-A routing area, where BEB1 and BEB2 represent two BEB identifiers of BEB 31, I10 and I11 represent two I-SIDs and B1 and B2 represent two B-VIDs. The IS-IS speaker 35 of ABB-1 (which is on the multipath instance B1) advertises, at least in part, "BEB1, I10, B3" and "BEB1, I11, B4" in the L2 routing area as a consequence of shortest path computation. The IS-IS speaker 36 of ABB-2 (which is on the multipath instance B2) advertises, at least in part, "BEB2, I11, B4" and "BEB2, I12, B3" in the L2 routing area.

This example illustrates that it is not a problem for L2 to have fewer multipath instances than L1, because multiple BEB identifiers (e.g., BEB1 and BEB2) can appear in the same B-VID (e.g., B3 and B4) in L2 but rooted on different nodes. It is also not a problem if L2 has more multipath instances than L1, because a BEB identifier can appear in more than one B-VID in L2. Moreover, as all traffic from L2 to L1 has a single root, there cannot be a conflict. This works because an L1 multipath associated with a B-VID, not an I-SID, picks the transit ABB. As a BEB identifier (per B-VID) cannot transit multiple ABBs, the uniqueness of BEB identifier per B-VID (in the L1 where the BEB resides) is sufficient to ensure correct construction of forwarding tables consistent with existing Ethernet implementations.

Figure 5:
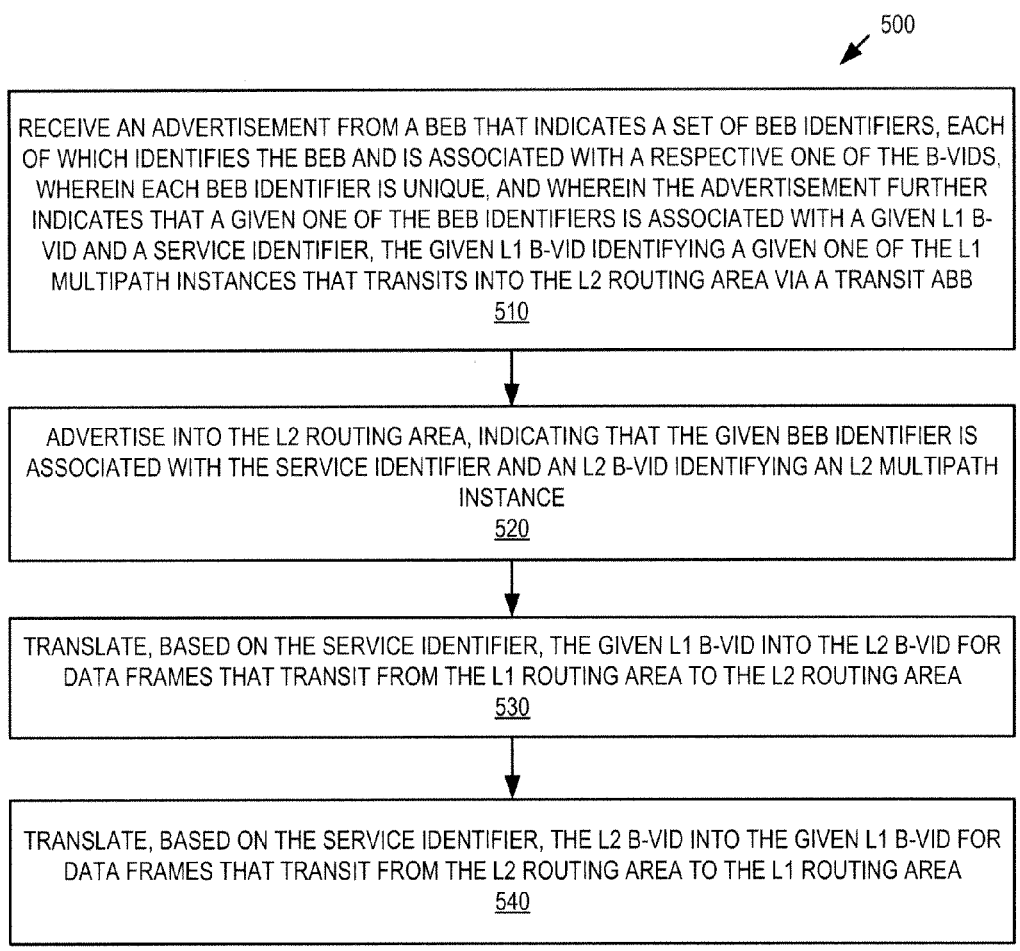
FIG. 5 is a flow diagram illustrating an embodiment of a method for providing a node with a unique identity per local multipath instance.

FIG. 5 is a flow diagram illustrating an embodiment of a method 500 for a routed Ethernet network includes multiple routing areas, where multipath implementation in each of the areas is independent of each other area to allow optimal network design in each of the areas. The network implements the SPBM protocol for sending frames across the areas. The L1 routing area including a BEB coupled to the ABBs via a plurality of L1 multipath instances that are identified by respective B-VIDs. Each L1 multipath instance provides the shortest path from the BEB to a virtualized node representing the L2 routing area by transiting a respective one of the ABBs. In one embodiment, the method can be performed by a network element, such as an ABB shown in FIG. 12.

In one embodiment, the method 500 comprising the following steps. The ABBs receive (block 510) an advertisement from the BEB that indicates a set of BEB identifiers, each of which identifies the BEB and is associated with a respective one of the L1 B-VIDs, wherein each BEB identifier is unique. The advertisement further indicates that a given one of the BEB identifiers is associated with a given L1 B-VID and a service identifier (e.g., an I-SID), the given L1 B-VID identifying a given one of the L1 multipath instances that transits into the L2 routing area via a transit ABB. The transit ABB advertises (block 520) into the L2 routing area, indicating that the given BEB identifier is associated with the service identifier and an L2 B-VID identifying an L2 multipath instance. This advertisement allows frames destined for the BEB via the given L1 multipath instance to be forwarded to the transit ABB. The given BEB identifier is advertised only by the transit ABB among the plurality of ABBs.

For data frames that transit from the L1 routing area to the L2 routing area, the transit ABB sets its translation table to translate (block 530) the given L1 B-VID into the L2 B-VID based on the service identifier. For data frames that transit from the L2 routing area to the L1 routing area, the ABB sets its translation table to translate (block 540) the L2 B-VID into the given L1 B-VID based on the service identifier.

Thus, upon receiving a data frame (which is identified by the service identifier and the given L1 B-VID), the transit ABB looks up the service identifier in its translation table specific to frames transiting from L1 to L2 to find an L2 B-VID that identifies an L2 multipath instance. The transit ABB replaces the given L1 B-VID with the L2 B-VID in the data frame, and transmits the data frame into L2 via the L2 multipath instance. Similarly, upon receiving a data frame (which is identified by the service identifier and the L2 B-VID) destined for the BEB, the transit ABB looks up the service identifier in its translation table specific to frames transiting from L2 to L1 to find the given L1 B-VID that identifies the given L1 multipath instance. The transit ABB replaces the L2 B-VID with the given L1 B-VID in the data frame, and transmits the data frame into L1 via the given L1 multipath instance.

According to the embodiments described above, the method 500 allows the operations of individual areas in a multi-area network to be decoupled from each other, such that the design of multipathing for the fabric in any individual area can be independently optimized for the local topology. According to the embodiments, a node (e.g., BEB) has a unique identity per local multipath instance so remapping of multipath does not introduce intractable connectivity problems.

In the following, an embodiment of the invention is described that provides the ability to independently and hitlessly (i.e., without loss of frames) move I-SIDs from one set of B-VIDs (one ECT set) to another in a given routing area without impacting adjacent routing areas. As a result, the complexity of the B-VID translation function in ABBs can be minimized. An I-SID migration procedure is described below that coordinates the modifications to the translation tables of the ABBs.

Figure 6:
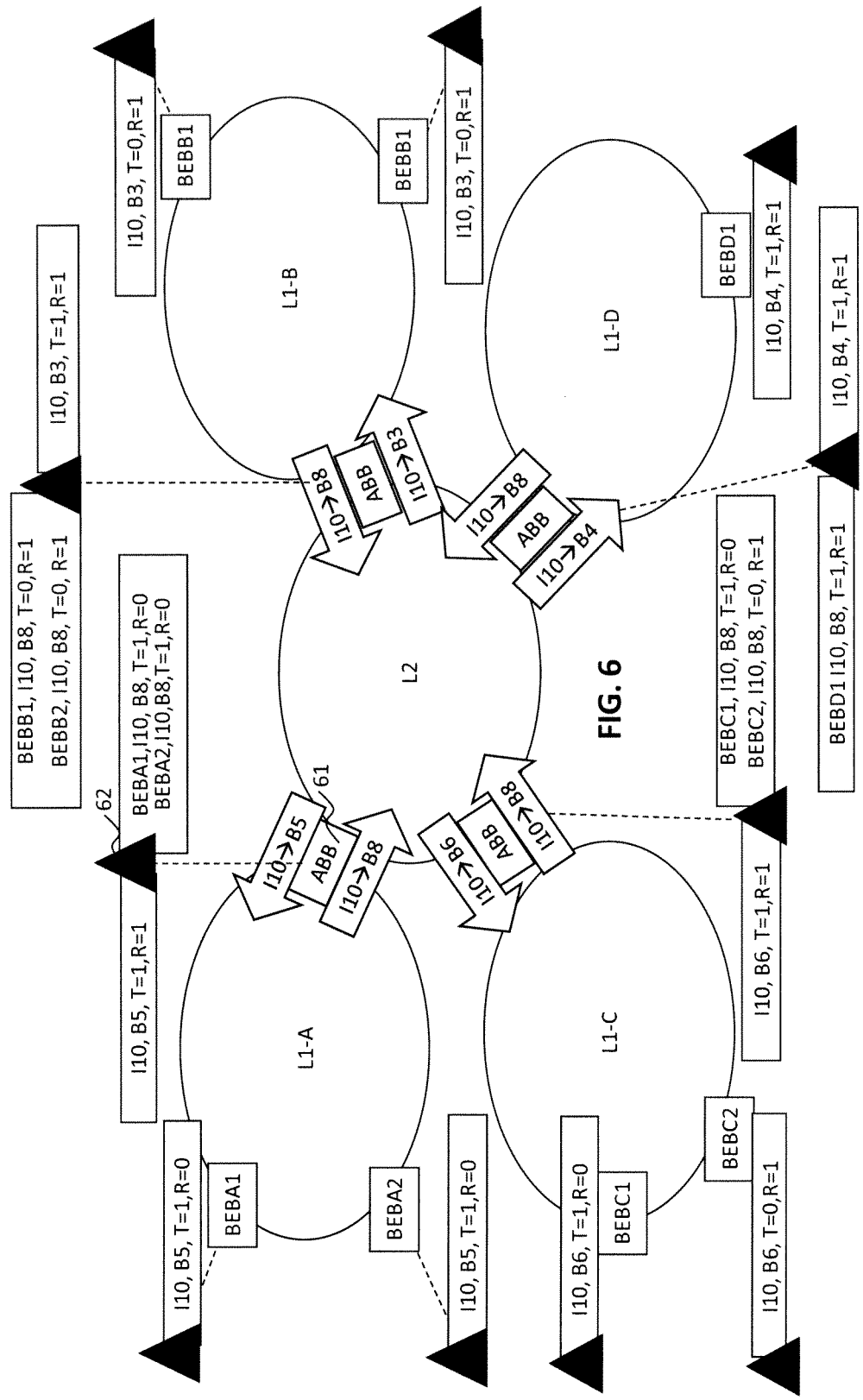
FIG. 6 illustrates an embodiment of a multi-area routed Ethernet network in steady state.

FIGS. 6-10 are a sequence of diagrams illustrating an example of a multi-area network in which an I-SID is moved from one B-VID to another in an L1 routing area. FIG. 6 illustrates the steady state behavior. The (T,R) attributes associated with the I-SID advertisement into L2 is the logical OR of the (T,R) attributes of the set of advertisements for that I-SID in L1.

Figure 7:
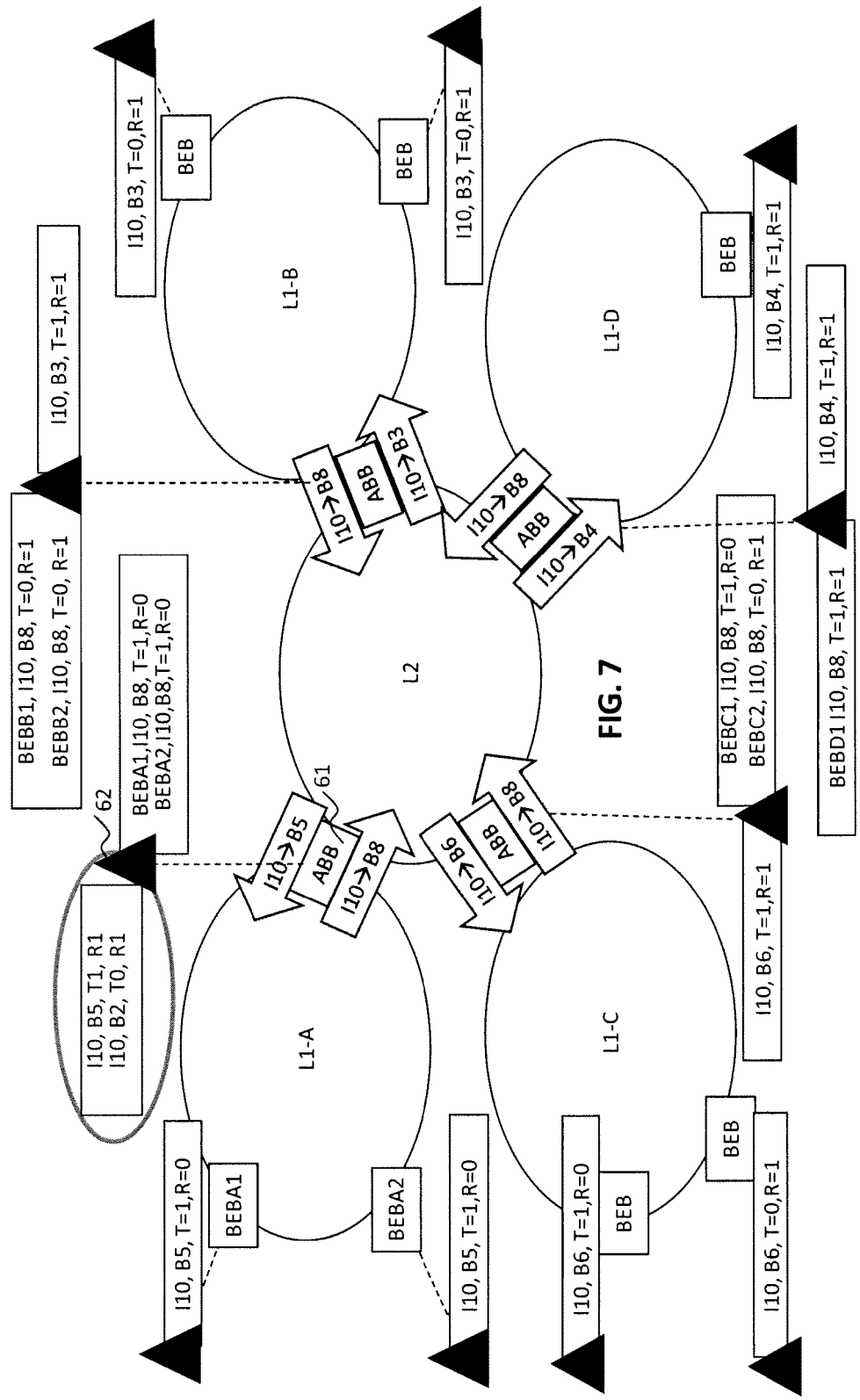
FIGS. 7-10 illustrate a sequence of operations for moving a service from one multipath instance to another in a routing area.
Figure 8:
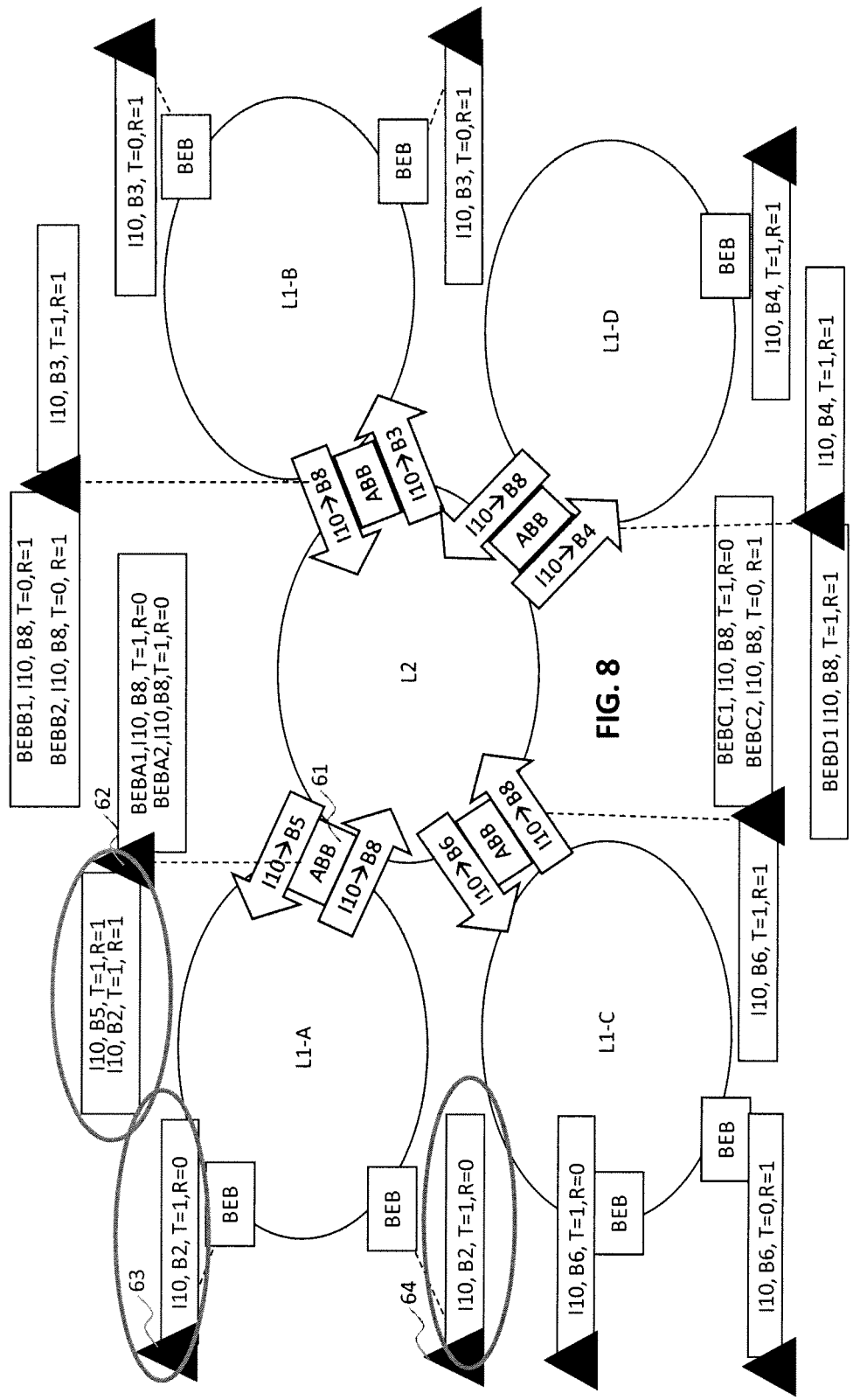
Figure 9:
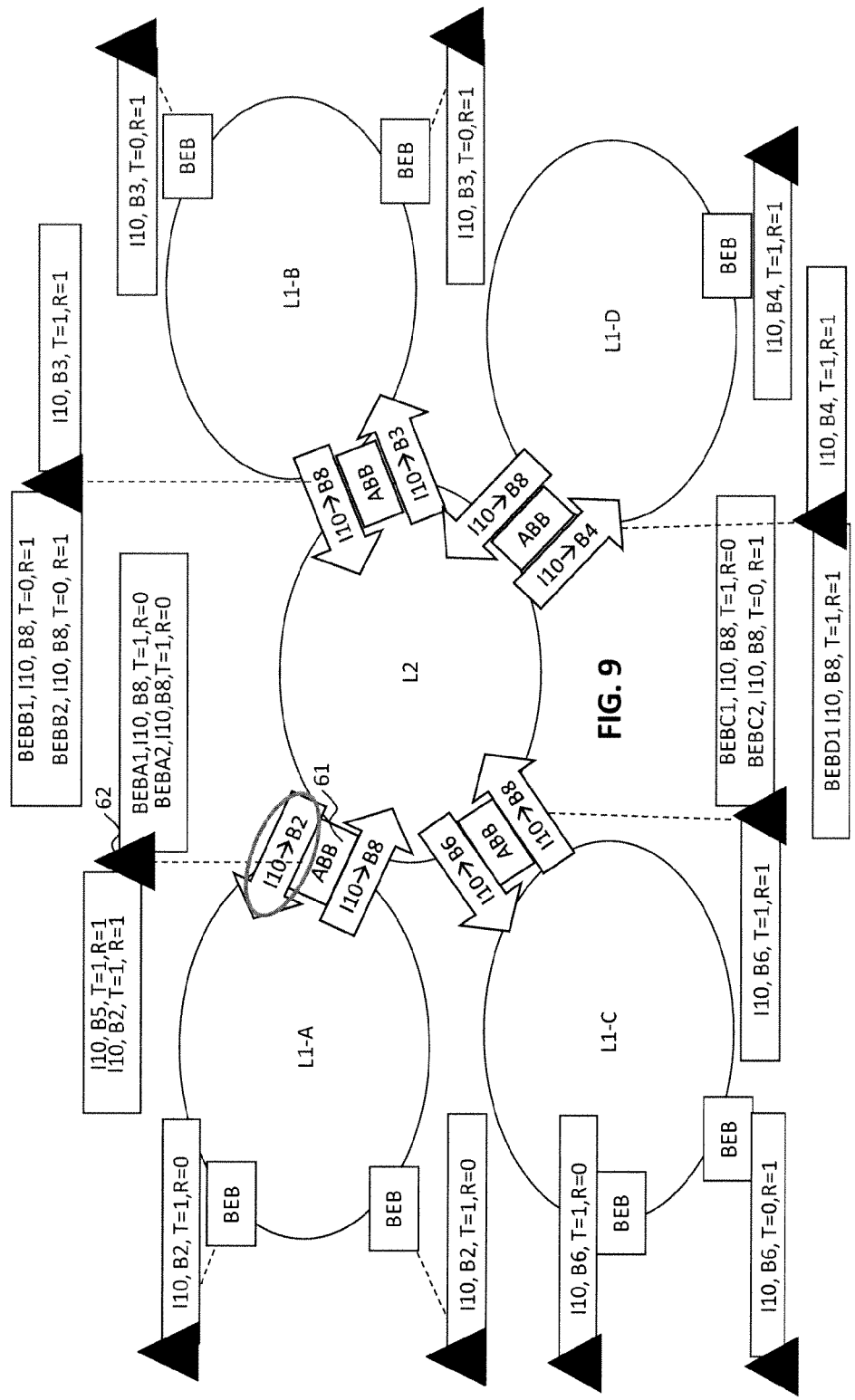
Figure 10:
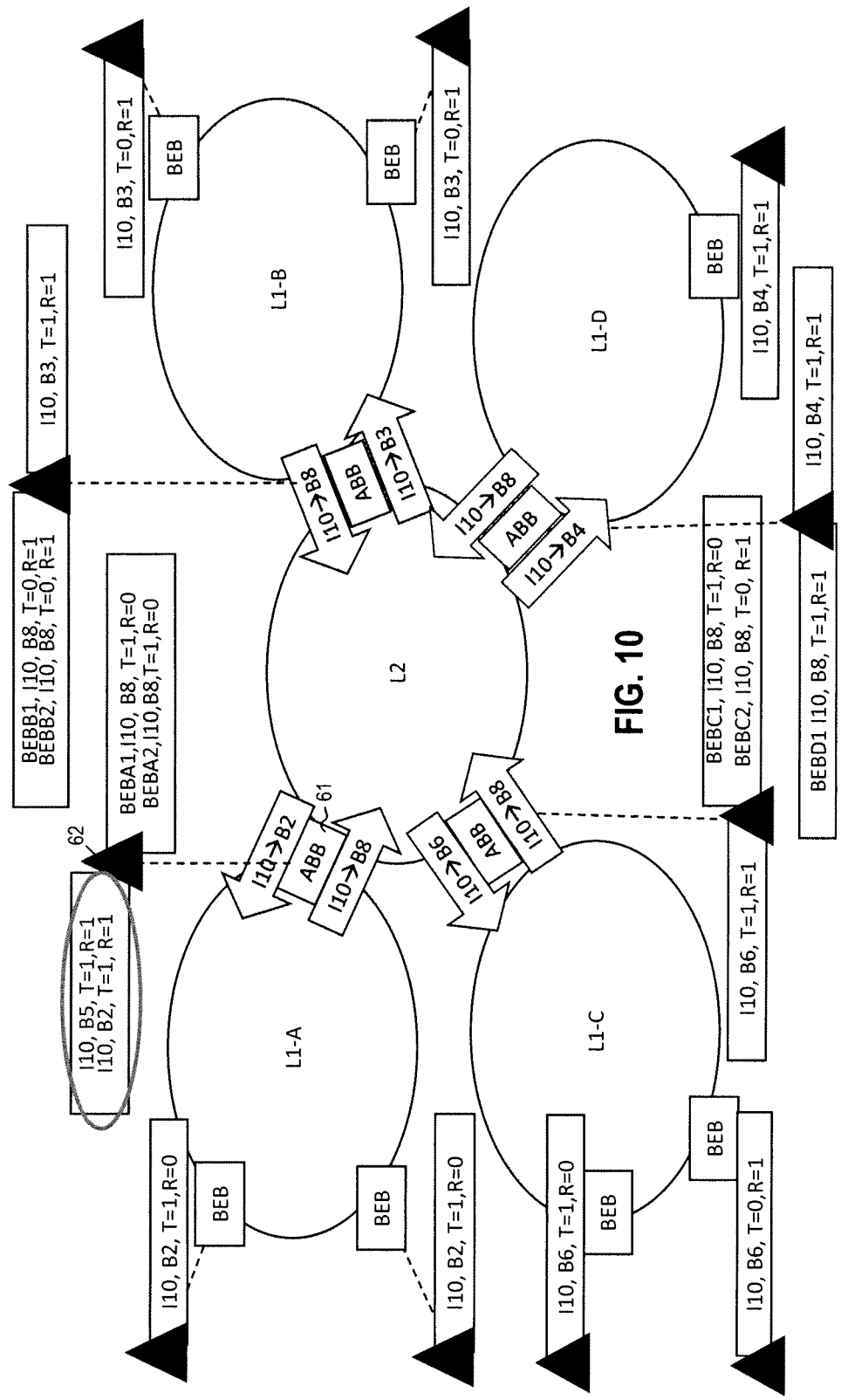

In the example of FIG. 6, it is shown that I-SID 10 (I10) is to be moved from one BVID (B5) in L1-A to another (B2). The circled blocks indicate where the action is taking place. First step, all I-SID 10 receivers in L1-A are set to listen to both B2 and B5 (FIG. 7). The I-SID 10 receiver in L1-A in this example is the IS-IS receiver 62 for ABB 61. Second step, all I-SID 10 transmitters are set to send on the paths B2 and B5 with sending on B2 in "standby"—L1-A will build multicast trees for I10 in both B-VIDs (FIG. 8). Third step, all I-SID 10 transmitters are set to send on B2 and B5 with sending on B5 in "standby" and B2 active. The I-SID 10 transmitters in L1-A in this example are the IS-1S transmitters 62, 63 and 64. While changing the standby and active modes, ABB 61 also changes the B-VID translation table for L2-to-L1-A, such that all I-SID 10 traffic arriving at ABB 61 will be forwarded to B2 (FIG. 9). Fourth step, all B5 instances for I-SID10 are decommissioned (FIG. 10).

Using a similar procedure (not shown), I-SID 10 in L2 can be moved from one BVID (B8) to another (B9). First step, all I-SID 10 receivers are set to listen to both B8 and B9. Second step, all I-SID 10 transmitters are set to transmit to both B8 and B9, with B9 in "standby." L2 constructs requisite multicast trees. Third step, all I-SID 10 transmitters are switched from active on B8 to active on B9, L1-to-L2 translation tables are updated at the same time. Then all B8 instances for I-SID10 can be decommissioned.

Figure 11:
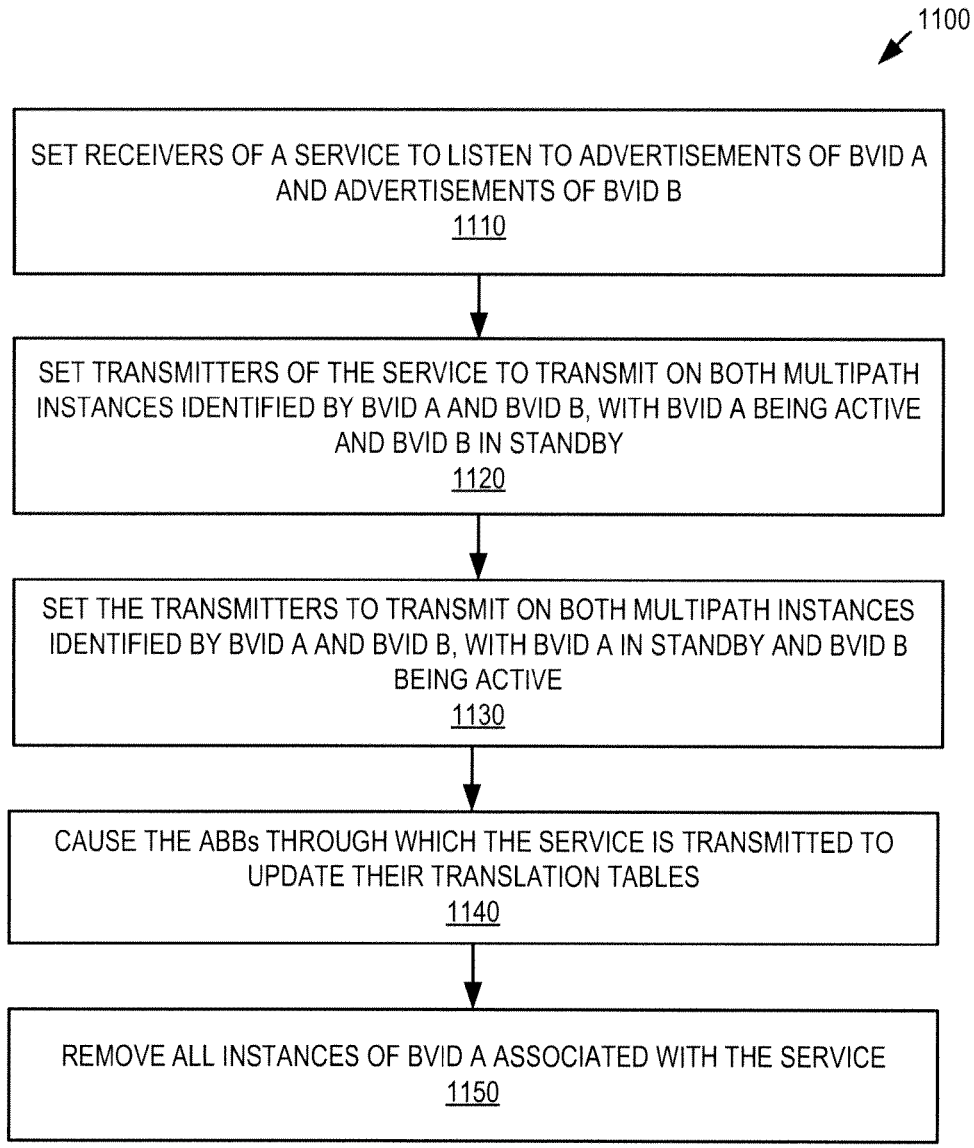
FIG. 11 is a flow diagram illustrating an embodiment of a method for moving a service from one multipath instance to another in a routing area.

FIG. 11 illustrates an embodiment of a method 1100 for moving a service from one multipath instance to another in a routing area within a multi-area routed Ethernet network. In one embodiment, the method 1100 provides an enhancement to the method 500 of FIG. 5 to permit reassignment of services to different multipath instances. In one embodiment, the method 1100 can be performed by an management system, such as the management system 110 in the network 100 of FIG. 1.

In one embodiment, the method 1100 begins with the management system setting receivers of a service in the L1 routing area to listen to advertisements of a B-VID A and advertisements of a B-VID B (block 1110). The management system also sets the transmitters of the service in the L1 routing area to transmit on both multipath instances identified by the B-VID A and the B-VID B, with the B-VID A being active and the B-VID B being in standby (block 1120). The management system then sets the transmitters of the service in the L1 routing area to transmit on both multipath instances identified by the B-VID A and the B-VID B, with the B-VID B being active and the B-VID A being in standby (block 1130). These settings cause the ABBs through which the service is transmitted to update their translation tables to indicate that the service has migrated to the B-VID B in the L1 routing area (block 1140). The management system then removes all instances of the B-VID A associated with the service to thereby complete migration of the service from the B-VID A to the B-VID B (block 1150).

Figure 12:
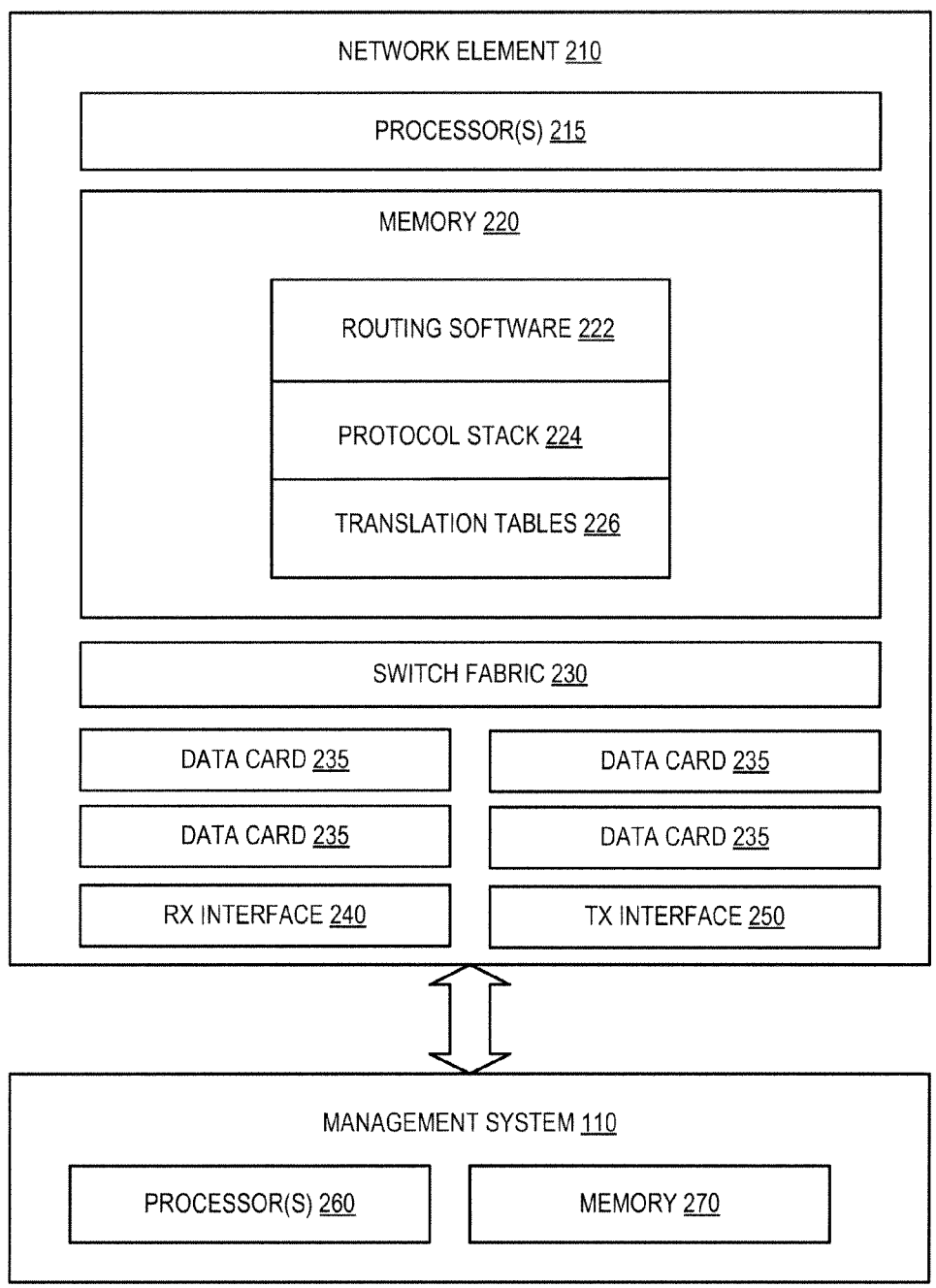
FIG. 12 is a block diagram illustrating a network element coupled to a management system according to one embodiment of the invention.

FIG. 12 illustrates an example of a network element 210 that may be used to implement an embodiment of the invention. As shown in FIG. 12, the network element 210 includes a data plane including a switching fabric 230, a number of data cards 235, a receiver (Rx) interface 240 and a transmitter (Tx) interface 250. The Rx and Tx interfaces 240 and 250 interface with links on the network, the data cards 235 perform functions on data received over the interfaces 240 and 250, and the switching fabric 230 switches data between the data cards/I/O cards. The network element 210 also includes a control plane, which includes one or more processors 215 containing control logic configured to implement a L1 link state routing process and a L2 link state routing process. Other processes may be implemented in the control logic as well. The network element 210 also includes a memory 220, which stores routing software 222, a protocol stack 224, and one or more translation tables 226. The routing software 222 may contain data and instructions associated with the L1 link state routing process and the L2 link state routing process. The protocol stack 224 stores network protocols implemented by the network element 210. The translation tables 226 implement the B-VID rewriting function described above. The network element 210 may contain other software, processes, and stores of information to enable it to perform the functions described above and to perform other functions commonly implemented in a network element on a communication network. In one embodiment, the network element 210 may be the ABB described above.

The embodiment of FIG. 12 also shows that the network element 210 is coupled to a management system, such as the management system 110 of FIG. 1. In one embodiment, the management system 110 includes one or more processors 260 coupled to a memory 270. The processors 260 include logic to control the operations of the network element 210, such as the operations described above in connection with FIG. 11.

The functions described above may be implemented as a set of program instructions that are stored in a computer readable memory and executed on one or more processors on a computer platform associated with a network element. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

The operations of the flow diagrams of FIGS. 5 and 11 have been described with reference to the exemplary embodiment of FIG. 12. However, it should be understood that the operations of the diagrams of FIGS. 5 and 11 can be performed by embodiments of the invention other than those discussed with reference to FIG. 12, and the embodiments discussed with reference to FIG. 12 can perform operations different than those discussed with reference to the diagrams of FIGS. 5 and 11. While the diagrams of FIGS. 5 and 11 show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

As used herein, a network element (e.g., a router, switch, bridge, controller) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by an area border bridge (ABB) in a routed Ethernet network that comprises multiple routing areas, wherein multipath implementation in each of the areas is independent of each other area to allow optimal network design in each of the areas, the network implementing a shortest path bridging medium access control (SPBM) protocol for sending frames across the areas, wherein the areas include a Level 2 (L2) routing area coupled to a Level 1 (L1) routing area via a plurality of ABBs, the L1 routing area including a backbone edge bridge (BEB) coupled to the ABBs via a plurality of L1 multipath instances that are identified by respective L1 backbone VLAN identifiers (B-VIDs), and wherein each L1 multipath instance provides the shortest path from the BEB to a virtualized node representing the L2 routing area by transiting a respective one of the plurality of ABBs, the method comprising the steps of:

receiving, by the ABBs, an advertisement from the BEB that indicates a set of BEB identifiers, each of which identifies the BEB and is associated with a respective one of the L1 B-VIDs, wherein each BEB identifier is unique, and wherein the advertisement further indicates that a given one of the BEB identifiers is associated with a given L1 B-VID and a service identifier, the given L1 B-VID identifying a given one of the L1 multipath instances that transits into the L2 routing area via a transit ABB;

advertising, by the transit ABB, into the L2 routing area, indicating that the given BEB identifier is associated with the service identifier and an L2 B-VID identifying an L2 multipath instance, to thereby allow frames destined for the BEB via the given L1 multipath instance to be forwarded to the transit ABB, wherein the given BEB identifier is advertised only by the transit ABB among the plurality of ABBs;

translating, by the transit ABB based on the service identifier, the given L1 B-VID into the L2 B-VID for data frames that transit from the L1 routing area to the L2 routing area; and translating, by the transit ABB based on the service identifier, the L2 B-VID into the given L1 B-VID for data frames that transit from the L2 routing area to the L1 routing area; and the method which is enhanced to permit reassignment of services to different multipath instances without loss of frames, comprising further the steps of: setting, by a management system, receivers of a service in a given one of the routing areas to listen to advertisements of a B-VID A and advertisements of a B-VID B, wherein each of B-VID A and B-VID B identifies a multipath instance in the given routing area;

setting by the management system transmitters of the service in the given routing area to transmit on both multipath instances identified by the B-VID A and the B-VID B, with the B-VID A being active and the B-VID B being in standby;

setting the transmitters of the service in the given routing area to transmit on both multipath instances identified by the B-VID A and the B-VID B, with the B-VID B being active and the B-VID A being in standby;

causing the ABBs through which the service is transmitted to update their translation tables to indicate that the service has migrated to the B-VID B in the given routing area; and removing all instances of the B-VID A associated with the service to thereby complete migration of the service from the B-VID A to the B-VID B.

2. The method of claim 1, wherein the number of multipath instances in the L1 routing area is independent of the number of multipath instances in the L2 routing area.

3. The method of claim 1, wherein each of the BEB identifiers is a backbone Medium Access Control (B-MAC) address.

4. The method of claim 1, wherein the number of ABBs between the routing L2 area and the L1 routing area is independent of the respective numbers of multipath instances in the L2 routing area and the L1 routing area.

5. The method of claim 1, wherein the advertisement is based on an Intermediate System to Intermediate System (IS-IS) protocol.

6. The method of claim 1, further comprising the steps of:

receiving via the given L1 multipath instance a first frame to be transiting into the L2 routing area, the first frame including the service identifier;

looking up the service identifier in a translation table specific to frames transiting from the L1 routing area to the L2 routing area to find the L2 B-VID that identifies the L2 multipath instance;

replacing the given L1 B-VID with the L2 B-VID in the first frame; and transmitting the first frame into the L2 routing area via the L2 multipath instance.

7. The method of claim 1, further comprising the steps of:
receiving via the L2 multipath instance a second frame destined for the BEB, the second frame including the service identifier;
looking up the service identifier in the translation table specific to frames transiting from the L2 routing area to the L1 routing area to find the given L1 B-VID that identifies the given L1 multipath instance;
replacing the L2 B-VID with the given L1 B-VID in the second frame; and
transmitting the second frame to the BEB via the given L1 multipath instance.

8. The method of claim 1, wherein lower bits of each BEB identifier are used to encode multipath instances into the L2 routing area, the method further comprising the steps of:
for all unicast frames transiting from the L2 routing area into the L1 routing area, zeroing the lowest n bits of their respective MAC addresses; and
for all unicast frames transiting from the L1 routing area into the L2 routing area, inserting VLAN ID (VID) information into the lowest n bits of their respective MAC addresses to provide the frames with a unique identifier in L2 routing area.

9. The method of claim 1, wherein the given routing area is the L1 routing area or the L2 routing area.

10. A network element in a routed Ethernet network that comprises multiple routing areas, wherein multipath implementation in each of the areas is independent of each other area to allow optimal network design in each of the areas, the network implementing a shortest path bridging medium access control (SPBM) protocol for sending frames across the areas, wherein the areas include a Level 2 (L2) routing area coupled to a Level 1 (L1) routing area via a plurality of area border bridges (ABBs), the L1 routing area including a backbone edge bridge (BEB) coupled to the ABBs via a plurality of L1 multipath instances that are identified by respective L1 backbone VLAN identifiers (B-VIDs), and wherein each L1 multipath instance provides the shortest path from the BEB to a virtualized node representing the L2 routing area by transiting a respective one of the plurality of ABBs, the network element comprising: a receiver interface configured to receive an advertisement from the BEB that indicates a set of BEB identifiers, each of which identifies the BEB and is associated with a respective one of the L1 B-VIDs, wherein each BEB identifier is unique, and wherein the advertisement further indicates that a given one of the BEB identifiers is associated with a given L1 B-VID and a service identifier, the given L1 B-VID identifying a given one of the L1 multipath instances that transits into the L2 routing area via a transit ABB; a transmitter interface configured to advertise into the L2 routing area, indicating that the given BEB identifier is associated with the service identifier and an L2 B-VID identifying an L2 multipath instance, to thereby allow frames destined for the BEB via the given L1 multipath instance to be forwarded to the transit ABB, wherein the given BEB identifier is advertised only by the transit ABB among the plurality of ABBs; and
a memory coupled to the receiver interface and the transmitter interface to store a translation table indexed by service identifiers; and
a processor coupled to the memory, the processor configured to translate the given L1 B-VID into the L2 B-VID for data frames that transit from the L1 routing area to the L2 routing area based on the service identifier, and to translate the L2 B-VID into the given L1 B-VID for data frames that transit from the L2 routing area to the L1 routing area based on the service identifier; and the network element, which is enhanced to permit reassignment of services to different multipath instances without loss of frames, the network element being coupled to a management system which is configured to:
set by the management system receivers of a service in a given one of the routing areas to listen to advertisements of a B-VID A and advertisements of a B-VID B, wherein each of B-VID A and B-VID B identifies a multipath instance in the given routing area;
set by the management system transmitters of the service in the given routing area to transmit on both multipath instances identified by the B-VID A and the B-VID B, with the B-VID A being active and the B-VID B being in standby;
set the transmitters of the service in the given routing area to transmit on both multipath instances identified by the B-VID A and the B-VID B, with the B-VID B being active and the B-VID A being in standby;
cause the ABBs through which the service is transmitted to update their translation tables to indicate that the service has migrated to the B-VID B in the given routing area; and
remove all instances of the B-VID A associated with the service to thereby complete migration of the service from the B-VID A to the B-VID B.

11. The network element of claim 10, wherein the number of multipath instances in the L1 routing area is independent of the number of multipath instances in the L2 routing area.

12. The network element of claim 10, wherein each of the BEB identifiers is a backbone Medium Access Control (B-MAC) address.

13. The network element of claim 10, wherein the number of ABBs between the routing L2 area and the L1 routing area is independent of the respective numbers of multipath instances in the L2 routing area and the L1 routing area.

14. The network element of claim 10, wherein the advertisement is based on an Intermediate System to Intermediate System (IS-IS) protocol.

15. The network element of claim 10, wherein the processor is further configured to:
receive via the given L1 multipath instance a first frame to be transiting into the L2 routing area, the first frame including the service identifier;
look up the service identifier in a translation table specific to frames transiting from the L1 routing area to the L2 routing area to find the L2 B-VID that identifies the L2 multipath instance;
replace the given L1 B-VID with the L2 B-VID in the first frame; and
transmit the first frame into the L2 routing area via the L2 multipath instance.

16. The network element of claim 10, wherein the processor is further configured to:
receive via the L2 multipath instance a second frame destined for the BEB, the second frame including the service identifier;
look up the service identifier in the translation table specific to frames transiting from the L2 routing area to the L1 routing area to find the given L1 B-VID that identifies the given L1 multipath instance;
replace the L2 B-VID with the given L1 B-VID in the second frame; and
transmit the second frame to the BEB via the given L1 multipath instance.

17. The network element of claim 10, wherein lower bits of each BEB identifier are used to encode multipath instances into the L2 routing area, the processor further configured to:

for all unicast frames transiting from the L2 routing area into the L1 routing area, zero the lowest n bits of their respective MAC addresses; and for all unicast frames transiting from the L1 routing area into the L2 routing area, insert VLAN ID (VID) information into the lowest n bits of their respective MAC addresses to provide the frames with a unique identifier in L2 routing area.

18. The network element of claim 10, wherein the given routing area is the L1 routing area or the L2 routing area.

* * * * *